No. 829,994. PATENTED SEPT. 4, 1906.
J. F. O'CONNOR.
COMBINED FRICTION AND SPRING RESISTANCE DRAFT RIGGING.
APPLICATION FILED JUNE 6, 1906.
2 SHEETS—SHEET 1.
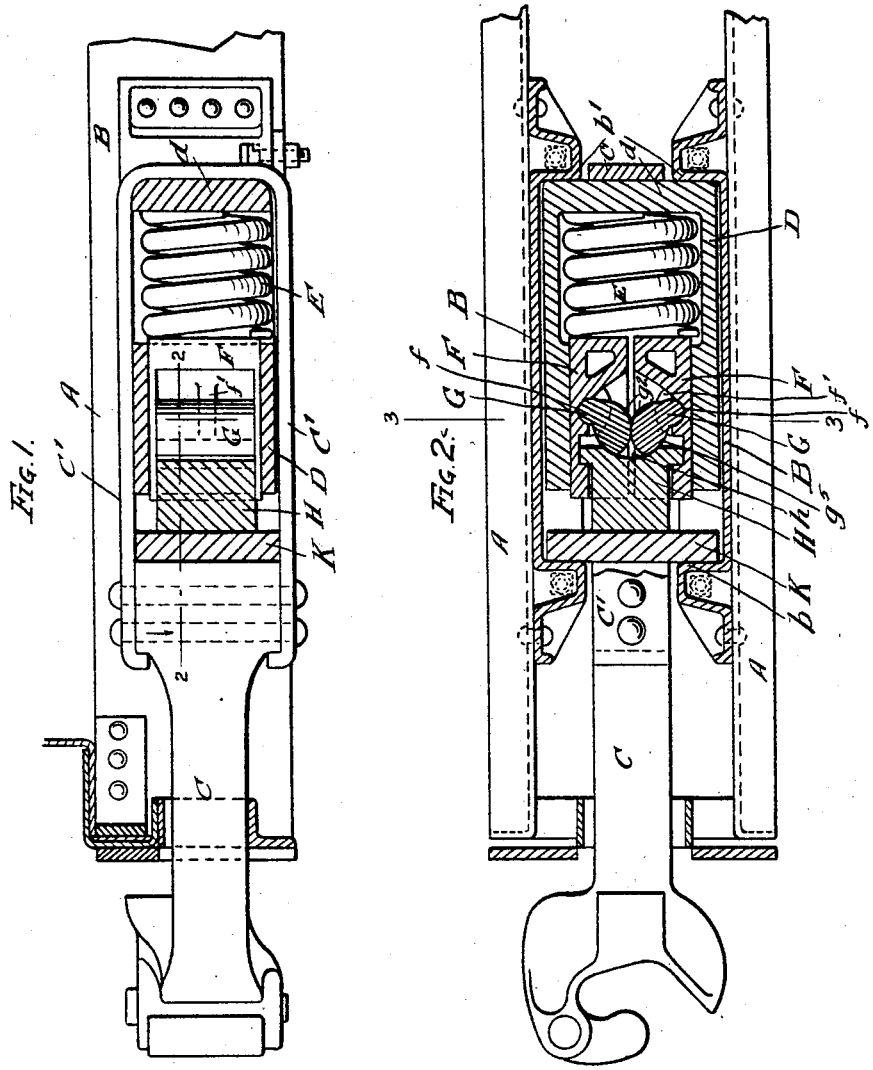
WITNESSES:
F. B. Townsend
A. W. Munday
INVENTOR
John F. O'Connor
BY
Munday, Evarts & Adcock
his ATTORNEYS No. 829,994. PATENTED SEPT. 4, 1906.
J. F. O'CONNOR.
COMBINED FRICTION AND SPRING RESISTANCE DRAFT RIGGING.
APPLICATION FILED JUNE 6, 1906.
2 SHEETS—SHEET 2.
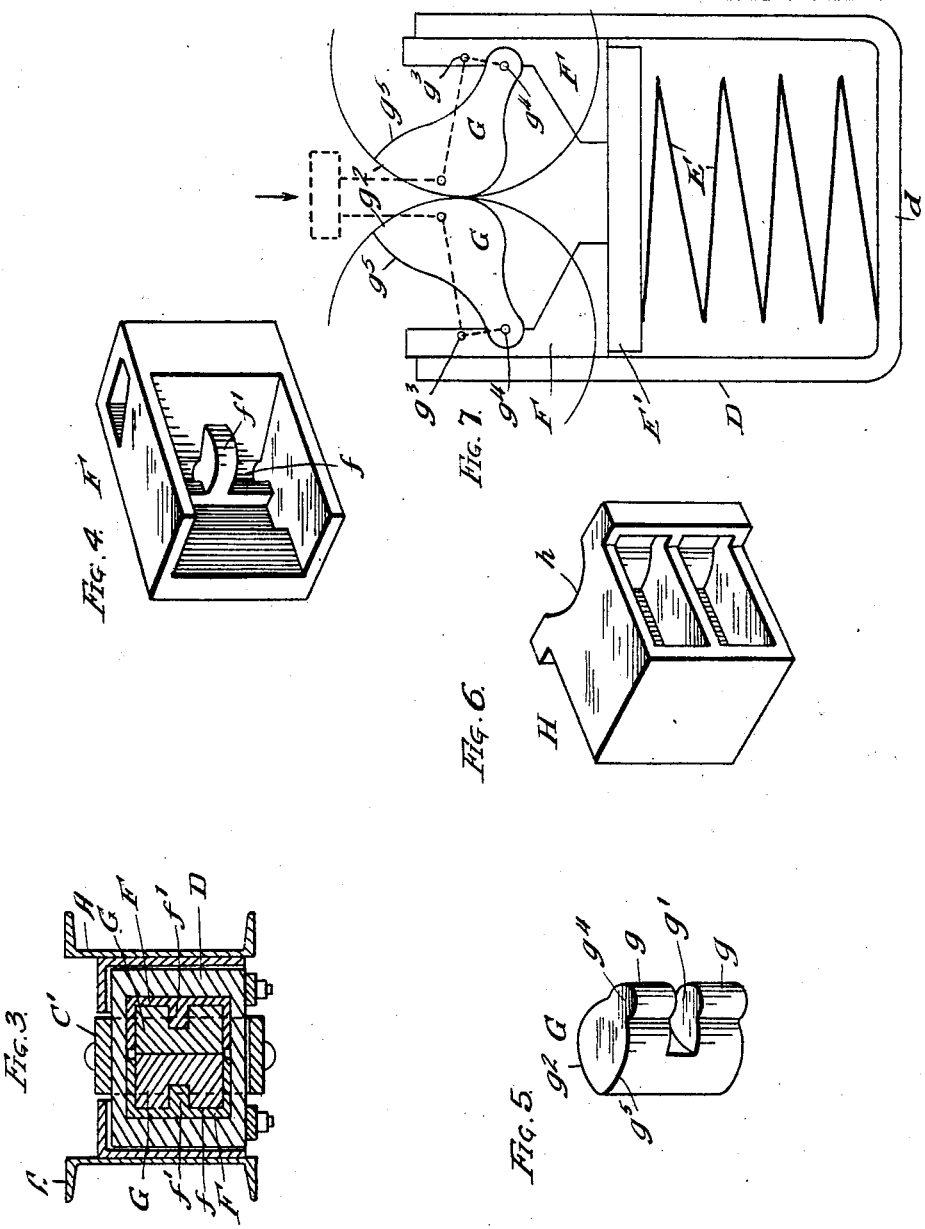
WITNESSES:
F. B. Townsend
[signature]
INVENTOR
John F. O'Connor
BY
Munday Evarts & Adcock
his ATTORNEYS

UNITED STATES PATENT OFFICE.

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

COMBINED FRICTION AND SPRING RESISTANCE DRAFT-RIGGING.

No. 829,994. Specification of Letters Patent. Patented Sept. 4, 1906.

Application filed June 6, 1906. Serial No. 320,380.

*To all whom it may concern:*

Be it known that I, JOHN F. O'CONNOR, a citizen of the United States, residing in Chicago, in the county of Cook and State of Illinois, have invented a new and useful Improvement in Combined Friction and Spring Resistance Draft-Rigging, of which the following is a specification.

My invention relates to improvements in friction-spring draft-rigging.

The object of my invention is to provide a combined friction and spring resistance draft-rigging of a strong, simple, efficient, and durable construction which will operate without danger of sticking and in which the friction resistance will always be exerted in a constant ratio to the load or thrust. My invention consists in the means I employ to practically accomplish this object or result—that is to say, it consists, in connection with the side plates or stop castings, the draw-bar, and front follower, of a longitudinally-movable friction case or shell serving also to contain the spring, and as an abutment for the rear end of the spring a pair of longitudinally-movable friction-shoes having a slidable friction engagement with the friction shell or case, a pair of rocking spreaders having circular contacting faces to force the friction-shoes against the friction shell or case, the circular faces of the rockers being struck about a center in advance of the pivotal center of the rockers, so as to maintain a constant ratio between the thrust or load upon the rockers and the part or component thereof transmitted to the friction-shoes and a pressure-block interposed between the draw-bar or front follower and the rockers and having a circular bearing-face engaging circular bearing-faces on the rockers, so that as the rockers turn about their pivotal centers the ratio of the load or thrust transmitted through the rockers to the friction-shoes will be maintained constant.

My invention also consists in the novel construction of parts and devices and in the novel combinations of parts and devices herein shown and described.

In the accompanying drawings, forming a part of this specification, Figure 1 is a side elevation, partly in longitudinal vertical section, of a friction draft-rigging embodying my invention. Fig. 2 is a plan view partly in horizontal section. Fig. 3 is a vertical cross-section on line 3 3 of Fig. 2. Fig. 4 is a detail perspective view of one of the friction-shoes. Fig. 5 is a detail perspective view of one of the rockers. Fig. 6 is a detail perspective view of the pressure-block, and Fig. 7 is a detail diagrammatic view illustrating the operation.

In the drawings, A represents the center sills or frame-pieces of the car to which the draft-rigging is attached. B represents the side plates or stop-castings, having front and rear stops $b$ $b'$. C is the draw-bar; C', the draw-bar strap or extension; D, the longitudinally-movable friction case or shell; E, the spring; F, the friction shoes or slides; G, the rockers or rocking spreaders by which the friction shoes or slides are forced into close frictional engagement with the friction shell or case D; H, the pressure-block, and K the front follower. The spring E is preferably contained in the rear end of the longitudinally-movable friction case or shell D, the end or bottom $d$ of which case serves also as a follower or abutment for the rear end of the spring. The front end of the spring abuts against the end of the friction shoes or slides F, or, if preferred or desired, a follower or bearing-plate E, as illustrated in Fig. 7, may be interposed between the front end of the spring and the rear end of the friction shoes or slides F. The friction shoes or slides F have pivot seats or bearings $f$ to receive the pivot ends $g$ of the rockers or rocking spreaders G. The shoes F are also preferably furnished with central strengthening-ribs $f'$, which fit in slots $g'$ in the rockers G. The rockers G have circular contacting faces $g^2$, which are struck about a center $g^3$ in advance of the pivotal center of motion $g^4$ of the rockers, (see Fig. 7,) so that as the rockers roll together a constant ratio will be maintained between the acting arms or limbs thereof, considered as levers, so that a constant ratio or component of the longitudinal load or thrust in the direction of the draw-bar upon the rockers will be transmitted to the friction-shoes F and the friction shell or case D, against which the friction-shoes slide, thus causing the frictional resistance to always maintain a constant ratio to the load or thrust upon the draw-bar. To further secure this result, the pressure-block H has a circular bearing-face $h$, which contacts with corresponding circular bearing-faces $g^5$ on the rockers, so that as the rockers turn about their pivotal centers the leverage thereof against the friction-shoes will not be changed.

It will of course be understood that the rockers G have but a very slight movement, just enough to tighten the friction-shoes F against the friction case or shell D; but as the friction-shoes and friction case or shell will necessarily wear more or less in operation, as will also the rockers and pressure-block to some extent, provision is made for such turning movement of the rockers as may occur incident to wear and other causes.

As by my construction and coöperative combination of parts the component of the longitudinal load or thrust upon the draw-bar, which is transmitted laterally or at right angles to the friction-shoes F, is always maintained constant, there is no danger of the friction devices sticking or failing to properly cushion in conjunction with the spring E the blows or thrust upon the draw-bar.

As the contacting faces $g^2$ of the rockers G are circular, as the rockers roll together their point of contact with each other remains the same distance in advance of the pivotal centers $g^4$ $g^4$, about which the rockers G G turn, and as the contacting faces $g^5$ $g^5$ of the rockers G G with the contacting face $h$ of the pressure-block H are also circular the center of pressure of the draw-bar against the rockers in respect to the pivotal center of the rockers also remains constant, and as a consequence it is a constant ratio or component of the longitudinal thrust of the draw-bar against the rocker which is imparted laterally or at right angles to the friction-shoes F F by the rockers G G. In this connection it will of course be understood that the lateral movement of the friction-shoes and the rocking movement of the rockers are but slight—simply sufficient to take up the play.

I claim—

1. In a friction-spring draft-rigging, the combination with the side plates or stop-castings, draw-bar and draw-bar strap or extension, of a longitudinally-movable friction case or shell, a spring in said case or shell, longitudinally-movable friction-shoes in said case or shell at one end of said spring, a pair of rockers pivotally mounted on said friction-shoes and having circular contacting faces struck about a center in advance of the pivotal center of said rockers and a movable pressure-block interposed between said rockers and the draw-bar, substantially as specified.

2. In a friction-spring draft-rigging, the combination with the side plates or stop-castings, draw-bar and draw-bar strap or extension, of a longitudinally-movable friction case or shell, a spring in said case or shell, longitudinally-movable friction-shoes in said case or shell at one end of said spring, a pair of rockers pivotally mounted on said friction-shoes and having circular contacting faces struck about a center in advance of the pivotal center of said rockers, and a movable pressure-block interposed between said rockers and the draw-bar, said pressure-block having a circular bearing-face and said rockers having circular bearing-faces engaging the circular bearing-face of the pressure-block, substantially as specified.

3. In a friction-spring draft-rigging, the combination with the side plates or stop-castings, draw-bar and draw-bar strap or extension, of a longitudinally-movable friction case or shell, a spring in said case or shell, longitudinally-movable friction-shoes in said case or shell at one end of said spring, a pair of rockers pivotally mounted on said friction-shoes and having circular contacting faces struck about a center in advance of the pivotal center of said rockers and a movable pressure-block interposed between said rockers and the draw-bar, and a follower interposed between the draw-bar and the pressure-block, substantially as specified.

4. In a friction-spring draft-rigging, the combination with the side plates or stop-castings, draw-bar and draw-bar strap or extension, of a longitudinally-movable friction case or shell, a spring in said case or shell, longitudinally-movable friction-shoes in said case or shell at one end of said spring, a pair of rockers pivotally mounted on said friction-shoes and having circular contacting faces struck about a center in advance of the pivotal center of said rockers and a movable pressure-block interposed between said rockers and the draw-bar, said pressure-block having a circular bearing-face and said rockers having circular bearing-faces engaging the circular bearing-faces of the pressure-block and a follower interposed between the pressure-block and the draw-bar, substantially as specified.

5. In a friction-spring draft-rigging, the combination with the side plates or stop-castings, draw-bar and draw-bar strap or extension, of a longitudinally-movable friction-case or shell, a spring in said case or shell, longitudinally-movable friction-shoes in said case or shell at one end of said spring, a pair of rockers pivotally mounted on said friction-shoes and having circular contacting faces struck about a center in advance of the pivotal center of said rockers and a movable pressure-block interposed between said rockers and the draw-bar, said friction-shoes having central strengthening-ribs and said rockers having slots to receive said ribs, substantially as specified.

6. In a friction-spring draft-rigging, the combination with the side plates or stop-castings, draw-bar and draw-bar strap or extension, of a longitudinally-movable friction-case or shell, a spring therein, sliding friction-shoes in said case or shell at one end of said spring, rocking spreaders bearing against said shoes to force the same into frictional engagement with said case or shell, a pressure-block bearing against said rocking spreaders and actuated by the draw-bar, said rocking spreaders and pressure-block being provided with means to cause the lateral or spreading force exerted upon the friction-shoes to bear a constant ratio to the longitudinal thrust or load upon the draw-bar, substantially as specified.

JOHN F. O'CONNOR.

Witnesses:
H. M. MUNDAY,
PEARL ABRAMS.